United States Patent [19]

Whidden

[11] Patent Number: 4,805,231

[45] Date of Patent: Feb. 14, 1989

[54] APPARATUS FOR DETECTING AN ELECTRONIC SURVEILLANCE DEVICE

[76] Inventor: Glenn H. Whidden, 13214 L'Enfant Dr., Fort Washington, Md. 20744

[21] Appl. No.: 32,609

[22] Filed: Apr. 1, 1987

[51] Int. Cl.[4] ...................... H04B 17/00; H04B 11/00

[52] U.S. Cl. ...................................... 455/228; 455/67; 455/226; 342/20

[58] Field of Search ................. 455/67, 226, 227, 228, 455/229; 367/2, 127, 124, 128; 342/20

[56] References Cited

U.S. PATENT DOCUMENTS

| | | | |
|---|---|---|---|
| 3,473,127 | 10/1969 | Williams et al. | 325/364 |
| 3,939,420 | 2/1976 | Risberg et al. | 325/67 |
| 4,127,817 | 11/1978 | Bell, Jr. | 325/364 |
| 4,264,978 | 4/1981 | Whidden | 455/67 |
| 4,368,539 | 1/1983 | Whidden | 455/166 |
| 4,399,556 | 8/1983 | Whidden | 455/67 |
| 4,501,020 | 2/1985 | Wakeman | 455/226 |

OTHER PUBLICATIONS

"Scanlock Mark VB", Publication from Technical Services Agency, Inc.

*Primary Examiner*—Robert L. Griffin
*Assistant Examiner*—Ralph E. Smith
*Attorney, Agent, or Firm*—Cushman, Darby & Cushman

[57] ABSTRACT

A method and apparatus for detecting a covert audio transmitter in which a microphone which picks up audio frequencies in the room and a radio receiver tuned to an unidentified audio signal are compared to determine if a "bug" is in the room being searched. An innocuous type of noise is introduced into the area to be searched by having persons converse or by turning on a radio, and these audio frequency signals are picked up directly by a microphone associated with the bug. The signal received by the bug causes the bug's RF carrier to be modulated, and this is picked up by the bug detector's radio receiver. The received signal is demodulated and is compared with the audio signal picked up by the bug detector's microphone to determine if the demodulated radio signal corresponds to the sounds in the room. If the demodulated signal from the detector's radio receiver matches the audio information picked up by the detector's microphone, an indicator light is lit to inform the operator that a bug is present.

23 Claims, 2 Drawing Sheets

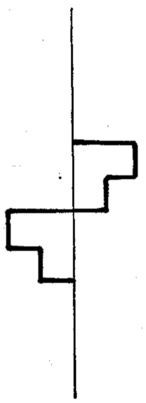
FIG. 3
SCF OUTPUT
FIG. 4
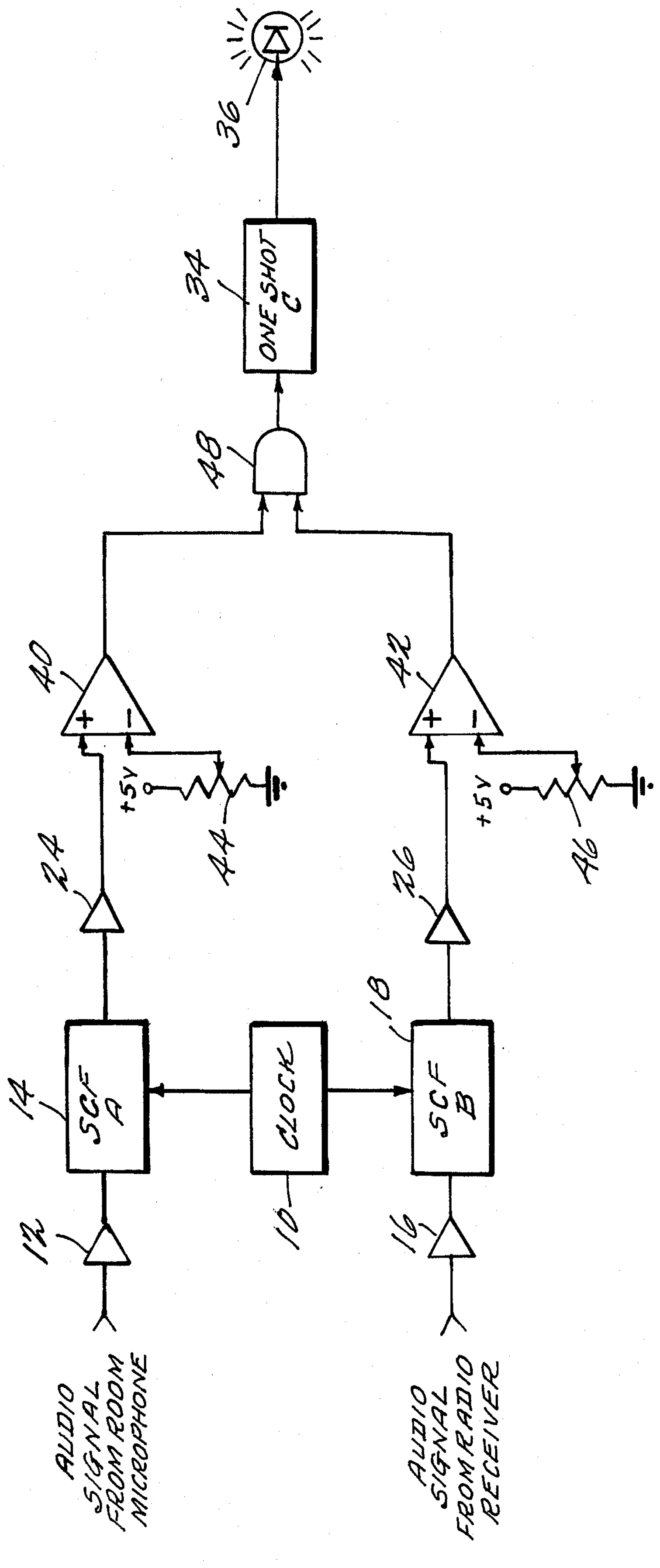

APPARATUS FOR DETECTING AN ELECTRONIC SURVEILLANCE DEVICE

BACKGROUND OF THE INVENTION

1. Field of the Invention

This invention relates generally to a method and apparatus for detecting the presence of a transmitter, particularly a covert eavesdropping audio transmitter, by detecting the radio frequency signal it broadcasts.

2. Description of the Prior Art

A typical audio surveillance apparatus or "bug" constitutes a transmitter operating on an R.F. carrier. The sounds picked up by the bug's microphone modulate the carrier and are transmitted to a remote location at which the bug is being monitored. When a signal received during the operation of a radio receiver, used, for example, to detect bugs, is suspected of coming from such a bug, the signal must be identified by examining the signal either visually or aurally for indications that it is being modulated by sounds in the room that is being searched. Identification of such a signal may be difficult because the signals transmitted by the bugs may often be weak and have a poor signal to noise ratio. One way to overcome that problem is to move the receiver until it receives the signal more clearly. In some situations, however, it may not be practical to move the receiver about, and in other situations such movement may not produce the desired effect.

Several methods and devices for detecting the R.F. signal emitted by the transmitter of a covert eavesdropping device are known in the prior art. For example, in U.S. Pat. No. 3,473,127 to Williams and U.S. Pat. No. 4,127,817 to Bell, the intercepted signal is demodulated and channeled by means of a loud speaker into the area being checked. If the signal in question emanates from an eavesdropping device, the device will pick up its own signal, thereby causing a feedback squeal. This system is not advantageous, however, for this feedback squeal unavoidably alerts the eavesdropper that detection efforts are being undertaken. The eavesdropper may thus turn off the eavesdropping device, thereby making the exact location of the bug and the listening location impossible to determine electronically.

Another method for detecting the presence of a bug involves using a search signal chosen so as to minimize the probability of the simultaneous occurrence of the search signal frequency in talk and music. The search signal is transmitted within the confined space suspected of containing a bug, and if a bug is present, the search signal will energize the microphone of the bug, thereby causing it to transmit a radio frequency signal which is modulated by the search signal. The radio frequency is then demodulated in the receiver, and the resulting demodulated signal is applied to a narrow band pass filter which is tuned to the search signal frequency. The output of the filter is sensed to determine if the bug is present. Such a method and device for implementing it are disclosed in U.S. Pat. No. 3,939,420 to Risberg et al. This method is also disadvantageous because the search signal may alert the eavesdropper that a hunt is underway for the bug. Also, as in the feedback method, the generation of such an audible signal in the area to be searched makes the continued operation of these devices during the course of confidential communications impractical. Similar problems exist with detection devices disclosed in U.S. Pat. No. 4,501,020 to Wakeman, and U.S. Pat. Nos. 4,399,556, 4,368,539 and 4,264,978 all to the present inventor.

SUMMARY OF THE INVENTION

Deficiencies of audio surveillance detecting apparatus of the type just described are virtually eliminated in accordance with the present invention. Accordingly, the object of the present invention is to provide a means for detecting a bug without alerting the eavesdropper that a search for the bug is being conducted.

The bug detector of the present invention utilizes a conventional scanning receiver or the normal tuning process of a radio receiver to detect the presence of a signal that cannot be identified or that is unusual because of its location in the radio frequency spectrum. Circuits of the present invention are then used with the radio receiver to identify the signal to determine if it is from an eavesdropping transmitter. This is performed by comparing the audible sounds picked up by a microphone in the room being searched with the demodulated signal from the radio receiver. The comparison of the audio signals is made in a very narrow band of frequencies. Thus, if a sound occurs in the room at a certain frequency and the same sound appears at the same frequency and at the same time on the receiver signal, and this occurs repeatedly, it is assumed that the received signal is modulated by sounds in the room.

Narrow band audio filtering in the radio receiver is used so as to reduce the noise bandwidth and improve the sensitivity of the system. Thus, if a signal at a certain audio frequency is the significant factor in the identification process, other frequencies in the audio range are insignificant. This fact is used in comparing the signal received by the radio receiver with the audio signal from the room microphone representing the sounds in the room. When the signals detected in the same narrow frequency band coincide, it is determined that there is a bug in the room. In practice it has been found that signals that are barely visible on a spectrum display device connected to the search receiver and that are barely audible, even when properly demodulated, can be identified using this circuitry.

The apparatus of the present invention is particularly useful because normal sounds such as conversation or music in the room being searched would not alert the eavesdropper that a search for the bug is being conducted, yet sounds at a given frequency in the range between 500 and 1000 Hz recur frequently enough to be used for comparison purposes in the present invention. No unusual sound would need to be generated in the room that might alert the eavesdropper, and the eavesdropper's interests may be maintained by the sounds in the room. The sounds also mask the noises made by those searching for the bug; therefore, the party monitoring the bug is not alerted that the search is being conducted. All the eavesdropper hears are normal sounds occurring in the room being bugged.

BRIEF DESCRIPTION OF THE DRAWINGS

These and other objects and advantages of the present invention will become more apparent and more readily appreciated in the following description of the presently preferred embodiment, taken in conjunction with the accompanying drawings, of which:

FIG. 3 illustrates a representative output of the filter of FIG. 2; and

FIG. 4 is a block diagram illustrating a second embodiment of the present invention.

DETAILED DESCRIPTION OF THE PREFERRED EMBODIMENT

Figure 1:
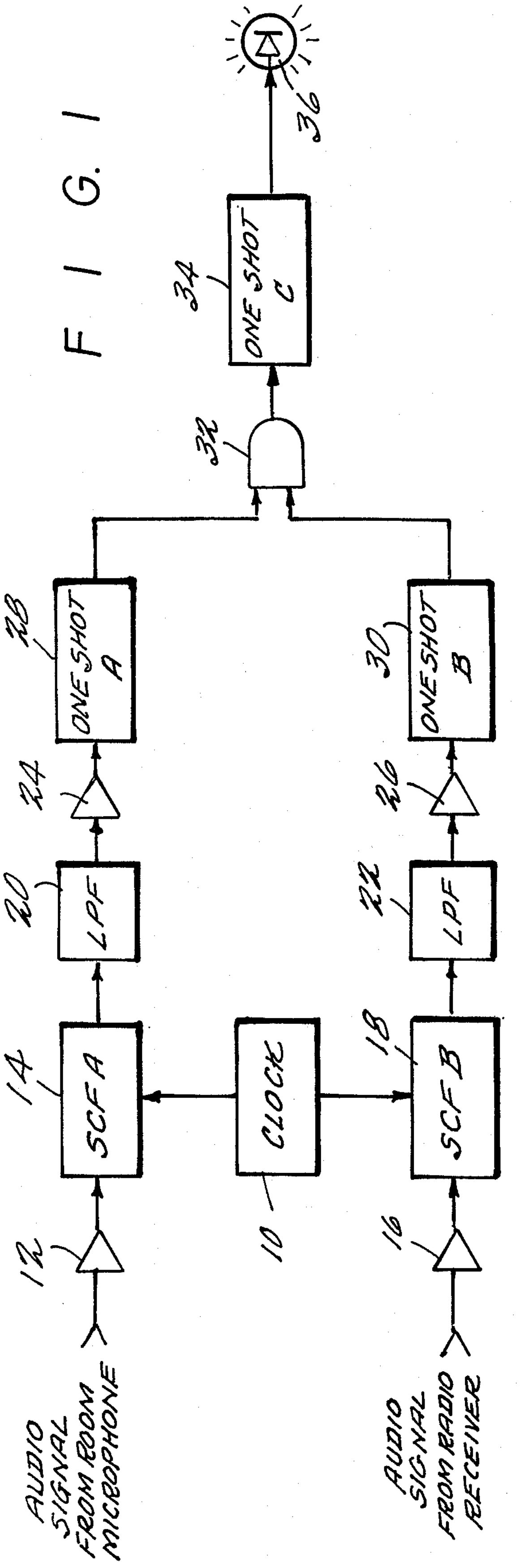
FIG. 1 is a block diagram illustrating a first embodiment of the present invention.

Referring first to FIG. 1 of the drawings, there is shown a first embodiment of the present invention. The circuitry consists of two switched capacitor filters (SCF) A and B that are controlled by the same clock generator 10. The filters are tuned to exactly the same frequency and are chosen to have Qs approaching 1000. A microphone is used to pick up sounds in the room being searched, and after amplification by amplifier 12, the sound signals are inputted into SCF A(14). Similarly, the audio output from a radio receiver used with the present invention is amplified by amplifier 16 and then inputted into SCF B(18).

Each SCF (which will be described in more detail below with reference to FIG. 2) outputs a signal which is low pass filtered by low pass filters 20 and 22, respectively, and further amplified by amplifiers 24 and 26, respectively, so as to eliminate switching components and to bring any signals which may be present to a logic level. Each amplified signal is then applied to the input of monostable multivibrators (one-shots) 28 and 30, respectively, each one-shot producing an output pulse of about 3.4 ms duration each time an input signal appears (and after the required reset time for the multivibrator circuit). The outputs of one-shots 28 and 30 are connected to the respective inputs of a two input AND gate 32. When the output pulses from the one-shots 28 and 30 coincide at any time, a signal appears at the output of the AND gate 32. That output signal is then applied to the input of one-shot 34, which acts as a pulse stretcher by producing a pulse of about 420 ms duration. The pulse is applied to LED 36 which is activated to indicate that the signal received from the radio receiver has been "identified" as a signal being output by the transmitter of a covert audio surveillance device.

Figure 2:
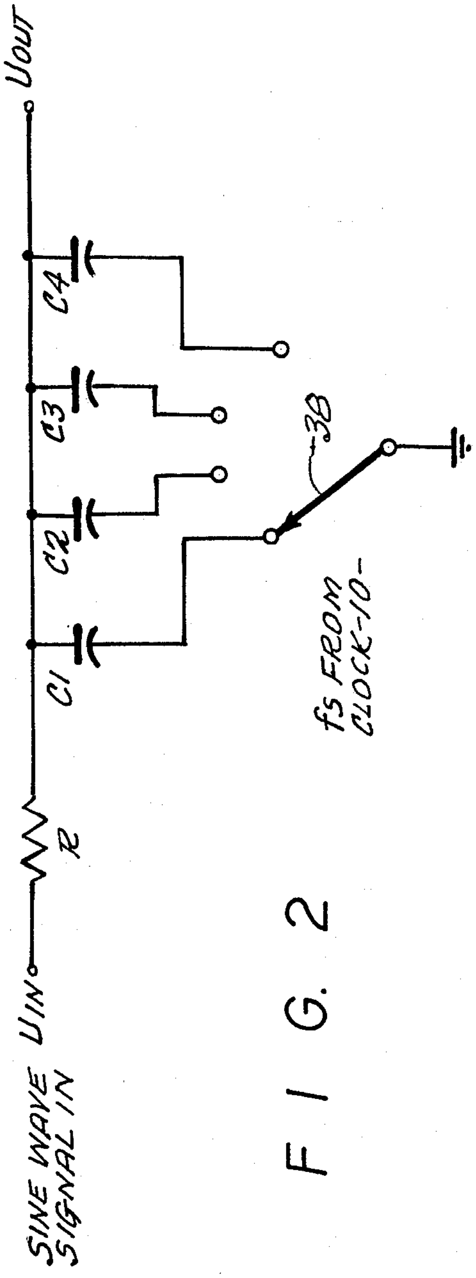
FIG. 2 illustrates a shunt-switched band pass filter for use in the apparatus of FIG. 1.

The switched capacitor filters SCF A and SCF B shown in FIG. 1 are configured as shunt-switched band pass filters as shown in FIG. 2. FIG. 2 shows a simple version of such a filter wherein the signal to be filtered is supplied across the $V_{IN}$ terminal and ground. When the switch 38 is in the left-hand position as shown, the left-hand capacitor C1 is charged through the resistor R. The switch 38 changes positions at a rate synchronized with the frequency of the switching signal $f_s$ received from clock 10. The switch 38 connects each capacitor C1–C4 to ground during a specific part of the signal cycle such that the switch 38 remains at each capacitor for the same portion and for the same duration of time for each cycle. Thus, in the example shown, the switch 38 remains at each capacitor for ¼ of a cycle of the signal and then is switched to the next capacitor for the next ¼ of a cycle, and so forth. After a few cycles, each capacitor is charged to the average level of the voltage at the part of the cycle to which the capacitor was exposed. When the capacitors are not connected to the switch 38, the capacitors "float" and retain their charge until they are exposed to the signal again.

The signal outputted at the $V_{OUT}$ terminal represents the voltage across each capacitor C1–C4 as it is activated by the switch 38. The output appears as a series of steps, with each step corresponding to the charge across each successive capacitor, as shown in FIG. 3. The switching components are then removed from this signal by passing it through a low pass filter (20 or 22 in FIG. 1) so that the coincidence of switching noise is not mistaken for an "identified" signal. When the signal frequency inputted into the SCF is appreciably different from the switching frequency $f_s$, the capacitors accumulate very little charge during the portion of the cycle that they are activated by the switch 38. This is so because each capacitor will be exposed to different parts of the signal cycle of the inputted frequency and will begin to charge or discharge each time they are exposed to the signal. Thus, the output signal will be at a low level.

As shown in FIG. 2, each SCF may have four capacitors C1–C4 which are charged across a resistance R. Each capacitor is connected to ground by switch 38 during a portion of the cycle of the switching signal $f_s$ as described above. The switching frequency $f_s$ in the FIG. 2 embodiment is preferably on the order of about 4000 Hz since a four capactor filter is being used. Thus, the signal frequency passed by the filters 14 and 18 is on the order of 1000 Hz, which is the frequency at which most microphones used for eavesdropping will have a good response and where many components of vocal and musical sounds appear. In practice, a switching frequency of 7812 Hz has been used for an eight capacitor filter resulting in a signal frequency passed by the filters of 976.5 Hz. In addition, capacitance values of 0.1 μF have been used with beneficial results.

Referring back to FIG. 1, the output of the SCFs 14 and 18 are amplified by amplifiers 24 and 26 after being low pass filtered by filters 20 and 22, respectively. Thus, whenever the voltage level of the inputted signal substantially corresponds to the voltage stored in the corresponding capacitor, a signal of a high voltage level is produced and amplified to a suitable logic level by amplifier 24 or 26. This amplification is performed by each step of the filtered signal outputted by the SCFs 14 and 18 which exceeds a threshold level. The high logic level signal from the amplifiers triggers the corresponding one-shot 28 or 30, and a pulse of 3.4 ms duration is produced. This 3.4 ms pulse provides a window of time for the comparison of the signal received by the radio receiver with the audio signal from the room microphone. If the pulse outputted by one-shot 28 corresponds in time with the pulse outputted by one-shot 30, as determined by AND gate 32, then one-shot 34 is activated to produce a pulse of about 420 ms duration so as to activate the LED indicator 36 for a period of time perceptible by the operator. When the LED indicator 36 is lit, the operator knows that the signal received by the radio receiver corresponds to the signals being generated within the room.

FIG. 4 shows a second embodiment of the present invention in which the circuitry of the first embodiment is further simplified. Like reference numerals correspond to like components in FIG. 1. As shown in FIG. 4, the output of each SCF is applied to the non-inverting input of comparators 40 and 42, respectively, and the inverting input of each comparator is respectively biased at a DC level above ground potential using potentiometers 44 and 46. When any component of the signal from the SCF has a higher potential than the bias level, the output of the comparator goes from a low logic level to a high logic level. Similarly, when the bias level is greater than the SCF output potential, the comparator output assumes a low logic level. The outputs of both comparators 40 and 42 are then applied to the inputs of AND gate 48. When both inputs to AND gate 48 are high, the output from AND gate 48 will go high and trigger one-shot 34, which will then cause the LED 36 to light. In this manner, coincidence between the sounds in the room and the sounds received by the radio receiver can be compared with greater sensitivity since one-shots 28 and 30 are no longer necessary to hold the output signals at logic level.

The embodiments of the present invention described above may be used in either of two ways. They can be used to identify a signal that has been acquired through a normal tuning process of a radio receiver, i.e., by a human operator, who has detected the presence of a signal that he cannot identify, or by a scanning receiver that has detected a signal that is unusual because of its location in the radio frequency spectrum. In addition, either system of the present invention can be used during a scanning process on each signal that is encountered. In that case, each signal would be examined using the system for a period that would suffice to assure that a distinguishing audio frequency had appeared in the sounds in the room several times. Such a scanning receiver is disclosed in U.S. Pat. No. 4,368,539 issued Jan. 11, 1983 to the present inventor.

Although only an exemplary embodiment of this invention has been described in detail above, those skilled in the art will readily appreciate that many modifications are possible in the preferred embodiment without materially departing from the novel teachings and advantages of this invention. For example, in each embodiment of the present invention, additional filtering may be added to reduce noise in the output of the radio receiver before applying the signal to the SCF. For this purpose, a bridged-T filter, for example, may be used to shape the frequency response of amplifier 16. In addition, an operational amplifier configured as an active filter could also be used. Accordingly, these and all such modifications are intended to be included in this invention as defined by the following claims.

What is claimed is:

1. A device for detecting a covert electronic surveillance apparatus of the type which senses information in the audio frequency range and which includes a covert transmittter for generating electromagnetic signals modulated by said information, comprising:

a microphone for receiving audio signals in an area to be searched;

first means for passing signals in a predetermined bandwidth from said microphone;

a radio receiver for receiving and demodulating said elecromagnetic signals from said covert electronic surveillance apparatus;

second means for passing signals in said predetermined bandwidth from said receiver; and means for comparing the outputs of said first and second passing means to detect coincident outputs indicative of the presence of said covert electronic surveillance apparatus.

2. A device as claimed in claim 1, wherein said radio receiver is a manually tunable radio receiver which is tuned by a human operator until an unidentified signal is received, said unidentified signal being applied to the input of said second passing means.

3. A device as claimed in claim 1, wherein said radio receiver is a scanning receiver which detects an unidentified signal because of its location in the radio frequency spectrum, said unidentified signal being applied to the input of said second passing means.

4. A device as claimed in claim 1, further comprising a clock generator, said first and second passing means including first and second shunt-switched bandpass filters responsive to said clock generator, said filters each comprising a switch and a plurality of capacitors, said switch connecting respective capacitors to ground at a rate synchronized with the frequency outputted by said clock generator.

5. A device as claimed in claim 4, wherein said comparing means comprises first and second monostable multivibrators responsive to the output of said first and second filters, respectively, said first and second monostable multivibrators respectively producing an output pulse of a first predetermined duration when an input signal is received.

6. A device as claimed in claim 5, wherein said comparing means further comprises pulse stretching means for outputting a pulse of a second predetermined duration when output pulses from said first and second monostable multivibrators are both of a predetermined logic level, said pulse of said second predetermined duration indicating that a signal received by said radio receiver is being outputted by said covert electronic surveillance apparatus.

7. A device as claimed in claim 5, wherein said first predetermined duration is approximately 3.4 milliseconds.

8. A device as claimed in claim 6, wherein said second predetermined duration is approximately 420 miliseconds.

9. A device as claimed in claim 5, wherein said comparing means further comprises a logic gate responsive to the outputs of said first and second monostable multivibrators said logic gate outputting a predetermined logic level when the outputs of said first and second monostable multivibrators are both of said predetermined logic level.

10. A device as claimed in claim 6, wherein said comparing means further comprises an indicator responsive to said pulse of said second predetermined duration for indicating that the signal received by said radio receiver is being outputted by said covert electronic surveillance apparatus.

11. A device as claimed in claim 4, wherein said comparing means comprises first and second comparators responsive to the output of said first and second filters, respectively, the output of said first and second filters being applied to respective non-inverting inputs of said comparators.

12. A device as claimed in claim 11, wherein said comparing means further comprises first and second potentiometers connected to respective inverting inputs of the comparators, the output of each of said potentiometers defining a threshold level to which the respective filter output is compared, said first and second comparators respectively outputting an output pulse of a predetermined logic level when the respective filter output exceeds said threshold level.

13. A device as claimed in claim 12, wherein said comparing means further comprises a logic gate responsive to the outputs of said first and second comparators, said logic gate outputting a predetermined logic level when the outputs of said first and second comparators are both of said predetermined logic level.

14. A device for detecting a covert electronic surveillance apparatus of the type which senses information in the audio frequency range and which includes a covert transmitter for generating electromagnetic signals modulated by said information, said detecting device comprising:

a microphone for receiving audio signals in an area to be searched;

a radio receiver for receiving and demodulating said electromagnetic signals from said covert electronic surveillance apparatus;

a clock generator;

first and second switched capacitor filters tuned to the same frequency and controlled by said clock generator, said first switched capacitor filter receiving said audio signals from said microphone as an input and said second switched capacitor filter receiving said demodulated electromagnetic signals from said radio receiver as an input;

first and second monostable multivibrators responsive to the output of said first and second switched capacitor filters, respectively, said first and second monostable multivibrators respectively producing an output pulse of a first predetermined duration when an input signal is received; and pulse stretching means for outputting a pulse of a second predetermined duration when output pulses from said first and second monostable multivibrators are both of a predetermined logic level, said pulse of said second predetermined duration indicating that a signal received by said radio receiver is being outputted by said covert electronic surveillance apparatus.

15. A method of detecting the presence of a covert audio transmitter in an area, comprising the steps of:

(a) detecting an unidentified radio signal;

(b) demodulating said unidentified radio signal in a radio receiver;

(c) receiving audio frequency signals from a microphone in the area to be searched;

(d) selectively bandpass filtering said unidentified radio signal and said received audio frequency signals over the same frequency range;

(e) comparing the filtered unidentified radio signal and the filtered received audio frequency signals; and (f) indicating coincidence of the filtered signals when said comparing step produces a favorable comparison.

16. A method in accordance with claim 15, wherein said selectively bandpass filtering step further comprises the steps of:

applying said demodulated unidentified radio signal to the input of a first switched capacitor bandpass filter;

applying said received audio frequency signals to the input of a second switched capacitor bandpass filer; and switching said first and second switched capacitor bandpass filters at a rate synchronized with the frequency of a timing signal such that each capacitor of said switched capacitor bandpass filter is connected to ground for a predetermined interval of the signal cycle of said timing signal.

17. A method in accordance with claim 16, wherein said comparing step further comprises the steps of:

generating a first pulse of a first predetermined duration in response to said filtered unidentified radio signal;

generating a second pulse of said first predetermined duration in response to said filtered received audio frequency signal;

applying said first and second pulses to first and second inputs of a logic gate; and outputting a signal of a predetermined logic level from said logic gate when said first and second pulses are both at said predetermined logic level during the same predetermined interval of the signal cycle of said timing signal.

18. A method in accordance with claim 17, wherein said indicating step further comprises the steps of:

generating a third pulse of a second predetermined duration when said logic gate outputs said predetermined logic level signal; and applying said third pulse to the input of an LED so as to indicate that the unidentified radio signal is being outputted by said covert audio transmitter.

19. A method in accordance with claim 18, wherein said first predetermied duration is approximately 3.4 milliseconds, said second predetermined duration is approximately 420 milliseconds, and said timing signal has a frequency approximately equal to 1000n Hz, where n equals the number of capacitors in each of said first and second switched capacitor bandpass filters.

20. A method in accordance with claim 15, wherein said detecting step detects said unidentified radio signal by manually tuning a radio receiver.

21. A method in accordance with claim 15, wherein said detecting step detects said unidentified radio signal by operating a scanning receiver and performing steps (b)–(f) for each unidentified signal in the radio frequency spectrum.

22. A method in accordance with claim 16, wherein said comparing step further comprises the steps of:

comparing the output of said first switched capacitor bandpass filter with a first threshold level and outputting a first pulse of a predetermined logic level when said threshold level is exceeded;

comparing the output of said second switched capacitor bandpass filter with a second threshold level and outputting a second pulse of said predetermined logic level when said threshold level is exceeded;

applying said first and second pulses to first and second inputs of a logic gate; and outputting a signal of a predetermined logic level from said logic gate when said first and second pulses are both at said predetermined logic level during the same predetermined interval of the signal cycle of said timing signal.

23. A method in accordance with claim 22, wherein said indicating step further comprises the steps of:

generating a third pulse of a second predetermined duration when said logic gate outputs said predetermined logic level signal; and applying said third pulse to the input of an LED so as to indicate that the unidentified radio signal is being outputted by said covert audio transmitter.

* * * * *